United States Patent [19]

Boudon et al.

[11] Patent Number: 4,825,339

[45] Date of Patent: Apr. 25, 1989

[54] SHEET METAL KNOCK-OUT

[75] Inventors: Douglas M. Boudon, Hubbard; Jim Gottsch, Tigard, both of Oreg.

[73] Assignee: Tektronix, Inc., Beaverton, Oreg.

[21] Appl. No.: 143,425

[22] Filed: Jan. 11, 1988

[51] Int. Cl.$^4$ ............................................. H02B 13/02
[52] U.S. Cl. .................................. 361/390; 174/35 R; 174/65 R; 220/266; 361/424
[58] Field of Search ............................ 174/35 R, 65 R; 220/265, 266, 274, 276; 361/331, 356, 364, 380, 390, 424, 428

[56] References Cited

U.S. PATENT DOCUMENTS

| | | | |
|---|---|---|---|
| 858,700 | 7/1907 | Bossert | 220/266 |
| 1,271,216 | 7/1918 | Platt | 220/266 |
| 2,000,851 | 5/1935 | Knell | 220/266 |
| 2,324,155 | 7/1943 | Haynes | 220/266 |
| 3,349,946 | 10/1967 | Lee | 174/65 R |
| 3,965,287 | 6/1976 | Mueller | 220/266 |

*Primary Examiner*—Gerald P. Tolin
*Attorney, Agent, or Firm*—David P. Peterson; Robert S. Hulse

[57] ABSTRACT

A knock-out in the wall of the housing for electronic equipment is selectively removed to provide a knock-out opening. A wall includes first and second slits positioned along the boundary of the knock-out and separated by a land. The wall includes a break out opening adjacent to each land. Break portions of the wall separate the break out opening from the first and second slits. These break portions are severed to interconnect the first and second slits through the break out opening and permit removal of the knock-out. Plural such slits and break out openings are provided and arranged to provide a knock out of rectangular or other desired geometric shape. The slits and break out openings are sized to provide electromagnetic interference shielding. Also, the break portions are of a length which is approximately no greater than the thickness of the wall and are positioned to facilitate removal of the knock-out without deforming the wall and without leaving burrs in the knock-out opening.

19 Claims, 2 Drawing Sheets

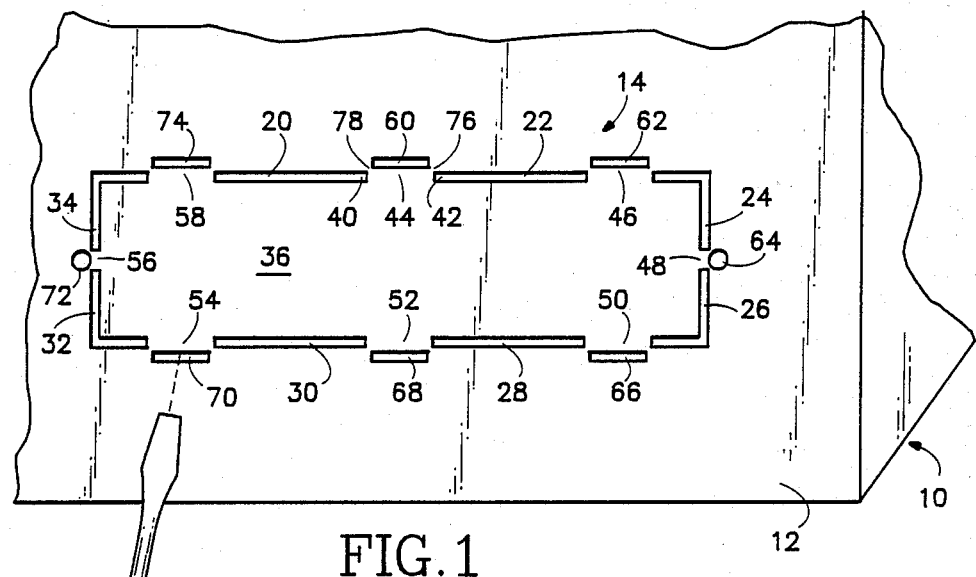
FIG.1
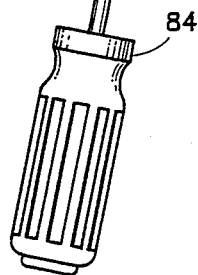
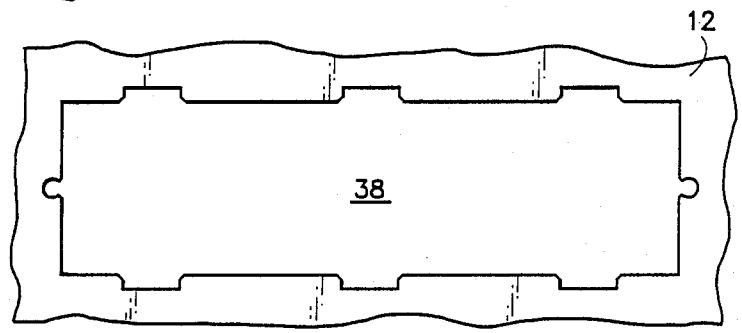
FIG.2
FIG.3

SHEET METAL KNOCK-OUT

TECHNICAL FIELD

The present invention relates to sheet metal knock-out constructions in general and more specifically to sheet-metal knock-out constructions for housings for graphics terminals or other electronic equipment.

BACKGROUND OF THE INVENTION

Prior art knock-out constructions commonly leave burrs or jagged edges projecting into a knock-out opening which remains when the knock-out is removed. These burrs can damage electrical cables passed through the openings and also can scratch or cut the fingers of users of these devices.

In addition, when used in a housing for electrical equipment, it is desirable that knock-out designs provide electromagnetic interference shielding in the event the knock-out is not used. Prior art constructions typically do not address the need for electromagnetic interference shielding.

Also, it is desirable that a knock-out design which is easy to manufacture, which has sufficient integrity to resist removal due to inadvertent impact, and which is easy to remove when desired without requiring special tools.

Therefore, a need exists for an improved knock-out construction which addresses these and other problems of the prior art.

SUMMARY OF THE INVENTION

In accordance with the present invention, a knock-out detail is provided in the wall such as of a housing for electronic equipment. The knock-out is selectively removed to provide a knock-out opening through the wall. The wall includes first and second slits positioned along the boundary of the knock-out and separated by a land. A break out opening is provided through the wall adjacent to each land. The land has break portions which separate the break out opening from the first and second slits. Severing the break portions of the land connects the first and second slits together through the break out opening and permits removal of the knock-out.

In accordance with a more specific aspect of the present invention, each of the break portions as a length which is approximately no greater than the thickness of the wall to facilitate removal of the knock-out without deforming the wall.

Plural slits separated by respective lands, with respective and break out openings are provided and arranged to provide a knock-out of the desired geometric shape. In certain applications, generally rectangular knock-outs are preferred.

The slits and break out openings are sized to meet electromagnetic interference shielding requirements. The width and length of the slits are varied in size in a conventional manner to provide electromagnetic interference shielding, for example, shorter and narrower openings provide shielding for electronic equipment operating at faster clock speeds.

As another specific feature of the invention, the portions of the slits adjacent each of the lands are along a line. In addition, the break out openings are sized and positioned such that the break portions are along lines extending at approximately forty-five degrees from the slits to the adjacent break out opening. Consequently, when the knock-out is removed, jagged burrs extending into the break out opening are minimized.

It is therefore one object of the present invention to provide improved knock-out details or constructions for sheet metal walls such as for walls used in electronic equipment housings.

It is another object of the present invention to provide knock-out details which provide electromagnetic interference shielding.

Still another object of the present invention is to provide knock-out details which minimize jagged edges or burrs being left at the periphery of a knock-out opening following removal of a knock-out.

A still further object of the present invention is to provide knock-out details having knock-outs, which may be easily and conveniently removed without requiring special tools.

Another object of the present invention is to provide knock-out details having knock-outs which are resistant to inadvertent removal upon impact and which are capable of passing Underwriter's Laboratory swing ball impact tests.

A still further object of the present invention is to provide knock-out constructions which are easy to manufacture.

These and other objects, features and advantages of the present invention will become apparent with reference to the following detailed description and drawing.

BRIEF DESCRIPTION OF THE DRAWING

FIG. 1 is a partially broken away isometric view of a housing with a sheet metal wall having a knock-out in accordance with one embodiment of the present invention.

FIG. 2 is a front elevational view of the wall of FIG. 1 with the knock-out removed to show the shape of the resulting knock-out opening.

FIG. 3 is a front elevational view of the knock-out removed from the wall of FIG. 2.

DETAILED DESCRIPTION OF PREFERRED EMBODIMENTS

Figure 4:
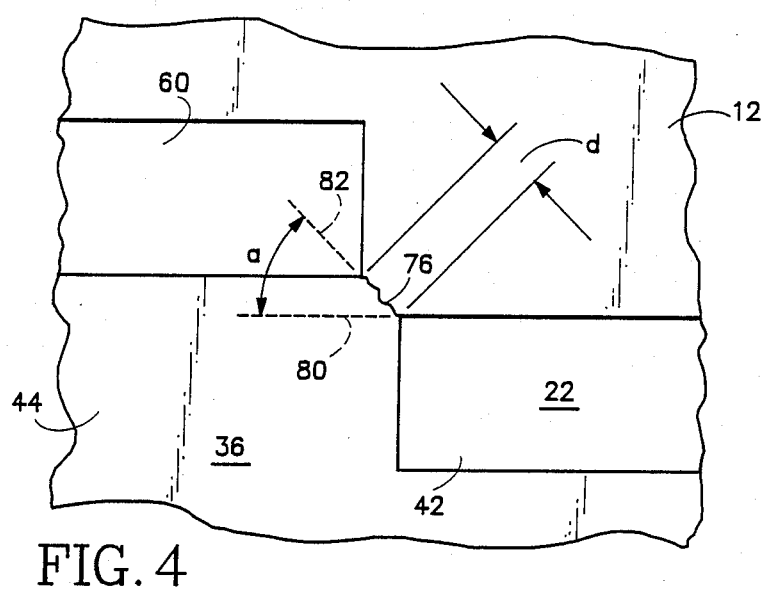
FIG. 4 is an enlarged view of a portion of the wall of FIG. 1 showing the break portion of the wall between a break out opening and a knock-out defining slit.

With reference to FIGS. 1-4, a housing 10 or a graphics terminal or other electronic equipment has a sheet metal wall 12 which is provided with a knock-out construction indicated generally at 14. The knock-out construction includes plural narrow elongated slits, in this case eight such slits 20-34 positioned about the boundary of a knock-out 36. The knock-out 36, (FIG. 3) is selectively removed, as explained below, to provide a knock-out opening 38 (FIG. 2) through wall 12.

An end 40 of slit 20 is separated from the adjacent end 42 of slit 22 by a land 44. Similarly, the adjacent ends of each of the other slits are separated from one another by respective lands 46-58.

These lands interrupt or limit the length of the slits so that the knock-out construction provides electromagnetic interference shielding when the knock-out is in place. That is, if the electronic equipment within housing 10 utilizes relatively fast clocks, the slits 20 through 34 are made relatively short and narrow in comparison to the size of slits used when slower clocks are employed in the electronic equipment. As a specific example, the slits are typically from 40 to 80 thousandths of an inch wide and 0.9 to 1.1 inches long with the exact dimensions being established in a conventional manner to provide the desired electromagnetic interference shielding. The slits, as well as other openings described below and included in the knock-out construction 14, are typically formed by punching or otherwise removing material from the sheet metal wall 12.

Additional openings which, for purposes of this description are called break out openings, are provided through wall 12 with one such break out opening being positioned adjacent to each of the illustrated lands. The break out openings are indicated by numbers 60–74 in FIG. 1. As an example, these break out openings may be of the same width as the slits and approximately 0.375 inches long. The lands 44–58 include break portions that separate the slits from the break out openings. Two such break portions 76, 78 are illustrated for land 44. These break portions are severed during removal of the knock-out 36 so that adjacent slits are connected together through the associated break out opening. Thus, in FIG. 1, when break portion 76 and 78 are severed, the ends 40 and 42 of respective slits 20 and 22 are interconnected through the break out opening 60.

As shown in FIG. 4, the shortest distance d between each of the break out openings, for example between opening 60 and the adjacent slit 22, is established by the size and position of the break out openings and slits. This distance is preferably approximately no greater than the thickness of the sheet metal wall 12. Although greater distances d still provide a functional knock-out design, as d increases beyond this preferred maximum distance, it becomes more difficult to remove a knock-out 36 from the wall 12 without deforming the remaining portions of the wall. As a more specific example, by making the distance d approximately 0.3 times the thickness of the wall, an easily removable knock-out 36 is provided. Yet, knock-out constructions of this design are strong enough to remain their integrity when subjected to impact during normal use. If the break portion 76 were severed at undesired times, electromagnetic interference shielding could be lost. In a specifically tested knock-out detail of the present invention, a wall of 0.080 inch thick aluminum was provided with a slit 22 and opening 60 separated by a distance d of 0.025 inches. Similar spacings were used for the other break out openings and slits of this construction. This specific construction satisfied the Underwriter's Laboratory impact swinging ball tests for electronic equipment housings and at the time provided electromagnetic interference shielding for a graphics. terminal.

Referring again to FIG. 4, the upper boundary of slit 22 is generally along a first line 80 and, although not shown in this figure, is also aligned with the upper boundary of slit 20. The break out opening 60 has a largest dimension which is shorter than the distance between the ends 40 and 42 of slits 20 and 22. Moreover, the break portion 76, along which the sheet metal wall is fractured during removal of the knock-out 36, is positioned along a line 82 at an acute angle "a" relative to the line 80. In the illustrated embodiment, the angle "a" is equal to approximately forty-five degrees. As a result, when wall 12 is fractured at 76, a bevelled or blunt corner is produced. This construction minimizes the formation of any burrs or jagged edges projecting into the knock-out opening 38 (FIG. 2) provided when the knock-out 36 is removed.

In operation, assume it is desired to remove the knock-out 36 of knock-out construction 14. As shown in FIG. 1, the flat blade of a screwdriver 84 is inserted into one of the break out openings, such as opening 70. The screwdriver is then rotated slightly to sever the break portions of wall 12 between slits 32 and 30 and break out opening 70. Typically adjoining break portions of the wall are also simultaneously severed. The screw driver is then inserted into one or more other break out openings as required and rotated until the knock-out 36 is free of the wall 12. Instead of using the break out openings for this purpose, a screwdriver may be inserted into the elongated slits and twisted to remove the knock-out 36. Therefore, removal of the knock-out is fast, convenient and easily accomplished and does not require any specialized tools.

FIG. 3 illustrates the knock-out 36 following its removal while FIG. 2 shows the knock-out opening 38 that remains in the wall 12.

Referring again to FIG. 1, the illustrated knock out design 14 defines a generally rectangular knock-out 36 as shown in FIG. 3. In the specific embodiment of FIG. 1, there are eight slits 20–34. Moreover, the slits 24, 26, 32 and 34 are each of an L-shape with two right angular legs. The slits 24 and 26 have upper legs which are aligned with one another and with the slits 20 and 22. In the same manner, the slits 26 and 32 have lower legs which are aligned with one another and with the slits 28, 30. In addition, the vertically extending legs of slits 32 and 34 in FIG. 1 are aligned with one another. Also, the vertically oriented legs of slits 24 and 36 in FIG. 1 are aligned to one another and are parallel to the corresponding legs of the slits 32 and 34. More of the slits 20–34 can be provided for a larger knock-out.

Figure 5:
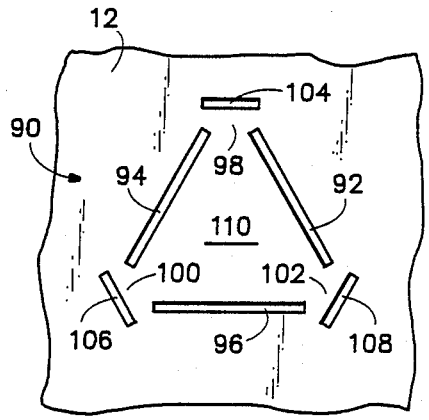
FIG. 5 is a front elevational view of a portion of a sheet metal wall having an alternate form of knock-out design in accordance with the present invention.

In the FIG. 5 embodiment of the invention, a knock-out construction 90 is shown with three elongated slits 92, 94 and 96 separated by respective lands 98, 100 and 102. Break out openings 104, 106 and 108 are positioned adjacent the respective lands 98, 100 and 102. In the FIG. 5 knock-out construction, portions of the lands between the slits and adjacent break out openings are severed to remove the knock-out 110. In this case, the knock-out 110 is of a generally truncated triangular shape and illustrates the versatility of the present invention in providing knock-out details of various sizes and configurations.

Figure 6:
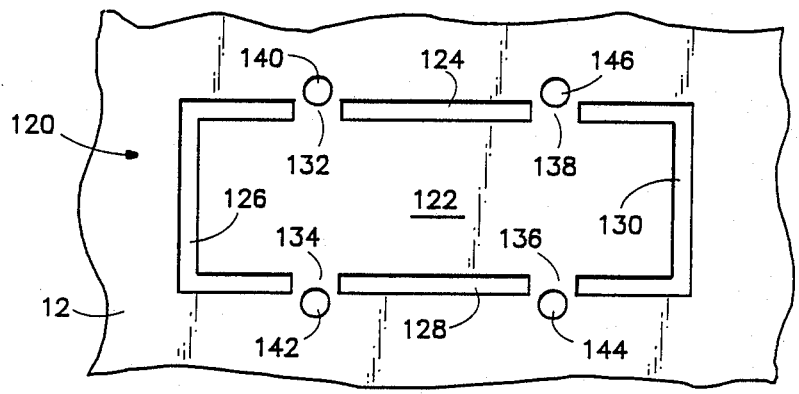
FIG. 6 is a front elevational view of a portion of a sheet metal wall with another embodiment of a knock-out construction in accordance with the present invention.

In the knock-out construction 120 of FIG. 6, a generally rectangular knock-out 122 is bounded by four elongated slits 124, 126, 128 and 130. The adjacent ends of the slits are separated by respective lands 132, 134, 136, and 138. Break out openings 140, 142, 144 and 146 are provided adjacent to each of the respective lands 132–138. These break out openings are generally of a circular configuration, have a diameter which is less than the distance between the ends of adjacent slits, and are positioned partially within the region between the respective adjacent slits. Again, the distance between the slits and break out openings is minimized as previously described to facilitate removal of knock-out 122.

In the illustrated FIG. 6 construction, the slits 126 and 130 are of generally U-shape with first and second parallel legs and a base extending perpendicular to and between the legs. As shown in FIG. 6, the upper legs of the slits 126 and 130 are aligned with one another and with the slit 124. In addition, the lower legs of these slits are aligned with one another and with the slit 128.

Like the FIGS. 1 and 5 constructions, the knock-out 122 of FIG. 6 is easily removed using a screwdriver.

Having illustrated and described the principles of my invention with respect to several preferred embodiments, it will be apparent to those skilled in the art that the invention may be modified in arrangement and detail without departing from the principles thereof. I claim as my invention all such modifications as come within the true spirit and scope of the following claims.

I claim:

1. A knock-out detail in a sheet metal wall, the knock-out detail defining a knock-out which is selectively removed along a boundary to provide a knock-out opening through the wall, comprising:

first and second slits in the wall positioned along the boundary of the knock-out;

the knock-out having a land which separates the first and second slits; and the wall including a break out opening adjacent to the land outside the boundary of the knock-out, the land including break portions which separate the break out opening from the first and second slits, the break portions being severed to connect the first and second slits together through the break out opening during removal of the knock-out such that no portion of the severed break portion extends into the knock-out opening after removal of the knock-out.

2. A knock-out according to claim 1 in which each of the break portions has a length which is approximately no greater than the thickness of the wall.

3. A knock-out according to claim 1 in which each of the break portions has a length which is approximately no greater than 0.3 times the thickness of the wall.

4. A knock-out detail in a sheet metal wall, the knock-out detail defining a knock-out which is selectively removed along a boundary to provide a knock-out opening through the wall, comprising:

first and second slits in the wall positioned along the boundary of the knock-out; the knock-out having a land which separates the first and second slits in which portions of the first and second slits adjacent the land are positioned in a first line which is interrupted by the land; and the wall including a break out opening adjacent to the land, outside the boundary of the knock-out, the land including break portions which separate the break out opening from the first and second slits, the shortest distance between the break out opening and the first slit being along a second line which is at an angle of approximately forty-five degrees with respect to the first line, the shortest distance between the break out opening and the second slit being along a third line which is at an angle of approximately forty-five degrees with respect to the first line, the break portions being along the second and third lines, the break portion being severed to connect the first and second slits together through the break out opening during removal of the knock-out.

5. A knock-out according to claim 4 in which the largest dimension of the break out opening is less than the distance between the first and second slits and in which the break out opening is located at an equal distance from each of the slits.

6. A knock-out according to claim 4 in which at least a portion of the break out opening is positioned between the first and second slits.

7. A knock-out detail in a sheet metal wall, the knock-out detail defining a knock-out which is selectively removed along a boundary to provide a knock-out opening through the wall comprising:

at least four slits in the wall positioned along the boundary of the knock-out, each slit having a first and a second end, the first end of each slit being positioned adjacent to a second end of a respective other slit with such first and second ends being separated by a land, the wall includes a break out opening adjacent to each land outside the boundary of the slits and break portions which separate the break out opening from the first and second ends of the slits, the break portions being severed during removal of the knock-out to connect the first and second ends of the slits through the 8. A knock-out in a sheet metal wall of a housing, such as for electronic equipment, the knock-out detail defining a knock-out which is selectively removed along a boundary to provide a knock-out opening through the wall, comprising:

at least three slits in the wall which each have a first end and a second end, the slits being oriented with the first end of one slit adjacent the second end of another slit and being positioned along the boundary of the knock-out;

the wall including a plural lands, each land being respectively positioned between and thereby associated with a first end of one slit and a second end of another slit; and plural break out openings through the wall, a respective break out opening being located adjacent to and associated with each land outside the boundary of the slits, the associated land having break portions which separate the associated break out opening from the first and second ends of the slits associated with the land, the break portions being severed to connect the first and second ends of the slits together through the break out opening during removal of the knock-out.

9. A knock-out detail in a sheet metal wall of a housing, such as for electronic equipment, the knock-out detail defining a knock-out which is selectively removed along a boundary to provide a knock-out the first end of each slit being positioned adjacent to a opening through the wall comprising:

at least three slits in the wall each of which have a first and a second end, the slits being oriented with the first end of one slit adjacent the second end of another slit and being positioned such that extending the slits would define the border of a geometric shape;

the wall including plural lands, each land being respectively positioned between and thereby associated with a first-end of one slit and a second end of another slit and in which the lands project outwardly from the knock-out beyond the border of the geometric shape; and plural break out openings through the wall, a break out opening being located adjacent to and associated with each land outside the border of the geometric shape, and in which the break out openings are outside of the borders of the slits, the associated land having break portions which separate the break out openings from the first and second ends of the slits associated with the land, the break portions being severed to connect the first and second ends of the slits together through the break out openings during removal of the knock-out.

10. A knock-out according to claim 9 in which the slits are positioned along the boundary of a rectangle.

11. A knock-out according to claim 10 in which there are at least four such slits, first and second of the slits being of U-shape with first and second parallel legs interconnected by a base extending perpendicular to and between the legs, the respective first legs of the first and second slits being positioned along a first line and the respective second legs of the first and second slits being positioned along a second line, a third of such slits being positioned along the first line and separated by lands from the first legs of the first and second slits, a fourth of such slits being positioned along the second line and separated by lands from the second legs of the first and second slits.

12. A knock-out according to claim 11 in which the break out openings are sized and positioned such that the maximum distance between the end of any slit and a break out opening is approximately no greater than the thickness of the wall.

13. A knock-out according to claim 12 in which at least one of the break out openings is circular, has to extend toward one another along a third line and being separated by a land, the second leg of the third slit and first leg of the fourth slit extending toward one another and being separated by a land and positioned along a fourth line parallel to the third line, the fifth and sixth slits being positioned along the first line between the first legs of the first and third slits and being separated from adjacent slits by lands, and the seventh and eighth slits being positioned along the second line between the second legs of the second and fourth slits and being separated from adjacent slits by lands.

14. A knock-out according to claim 10 in which there are at least eight such slits, first, second, third and fourth of the slits being of an L-shape with first and second legs, the first leg of the first slit and first leg of the third slit being positioned along a first line, the second leg of the second slit and second leg of the fourth slit being positioned along a second line parallel to the first line, the second leg of the first slit and first leg of the second slit being positioned a diameter which is less than the distance between the ends of the slits adjacent to the break out opening, and is symmetric with respect to and extends partially into the land between the ends of the slits adjacent to the break out opening.

15. A knock-out according to claim 14 in which the break out openings are sized and positioned such that the maximum distance between the end of any slit and a break out opening is approximately no greater than the thickness of the wall.

16. A knock-out according to claim 15 in which at least one of the break out openings is a slit with a length less than the distance between the ends of the slits adjacent to the break out opening, at least one break out opening also being positioned outside of the land between the ends of such slits.

17. A housing for electronic equipment having a wall comprising:
   at least one knock-out in the wall which is selectively removed to provide a knock-out opening through the wall;
   the knock-out having a peripheral boundary in the form of a closed geometric shape;
   a first set of at least three slits provided about the boundary, the slits being sized to maintain effective electromagnetic interference shielding and each pair of slits being separated by a respective land portion of the wall; wherein the wall defines a break-out opening adjacent to each land outside the boundary of the closed geometric shape, the land portion including a break portions which separate the break out opening from the adjacent slits, the break portions being severed to connect the first and second slits together through the break out opening during removal of the knock-out.

18. A housing according to claim 17 in which the break portions each have a maximum length which is approximately no greater than the thickness of the wall.

19. A housing for electronic equipment having a wall comprising:
   at least one knock-out in the wall which is selectively removed to provide a knock-out opening through the wall;
   the knock-out having a peripheral boundary in the form of a closed geometric shape;
   a first set of at least three slits provided about the boundary, the slits being sized to maintain effective electromagnetic interference shielding and each pair of slits being separated by a land portion of the wall; a break out opening adjacent to each land outside the boundary of the closed geometric shape, the land including break portions which separate the break out opening from the adjacent slits in which the end portion of the slits separated by a land are along a line and in which the break portion extends at an angle of approximately forty-five degrees from the line to the break out opening adjacent to the land.

* * * * *